United States Patent [19]

Shriver

[11] Patent Number: 4,771,879
[45] Date of Patent: Sep. 20, 1988

[54] CONTAINER TRANSFER SYSTEM

[75] Inventor: Frank L. Shriver, Lakewood, Colo.

[73] Assignee: Adolph Coors Company, Golden, Colo.

[21] Appl. No.: 69,397

[22] Filed: Jul. 1, 1987

[51] Int. Cl.⁴ .................. B65G 47/91; B65G 47/04
[52] U.S. Cl. .................. 198/471.1; 198/803.5; 101/40
[58] Field of Search .......... 198/471.1, 689.1, 803.5, 198/404, 408; 101/37, 38 R, 38 A, 39, 40

[56] References Cited

U.S. PATENT DOCUMENTS

| | | | |
|---|---|---|---|
| 3,592,320 | 7/1971 | Binggeli | 198/471.1 X |
| 3,841,687 | 10/1974 | Banyas et al. | 198/803.5 X |
| 3,907,095 | 9/1975 | Russell et al. | 198/493 X |
| 4,222,479 | 9/1980 | Dugan et al. | |
| 4,265,073 | 5/1981 | Seragnoli | 53/542 |
| 4,445,431 | 5/1984 | Stirbis | 198/471.1 X |
| 4,565,713 | 1/1986 | Schultz . | |

FOREIGN PATENT DOCUMENTS 2805271  8/1979  Fed. Rep. of Germany ... 198/689.1

Primary Examiner—Robert J. Spar
Assistant Examiner—Lyle Kimms
Attorney, Agent, or Firm—Klaas & Law

[57] ABSTRACT

A transfer system for transferring decorated containers, having images of wet ink of the outer peripheries thereof, from a first container carrying apparatus, comprising a continuously rotating wheel type apparatus carrying decorated containers with their open ends exposed, to a second container carrying apparatus, comprising a continuously moving vacuum belt for carrying the decorated containers through a curing oven with their open ends exposed, comprising a continuously rotating transfer wheel which carries the decorated containers with their closed ends exposed and which is located between the first and second container carrying apparatuses.

22 Claims, 4 Drawing Sheets

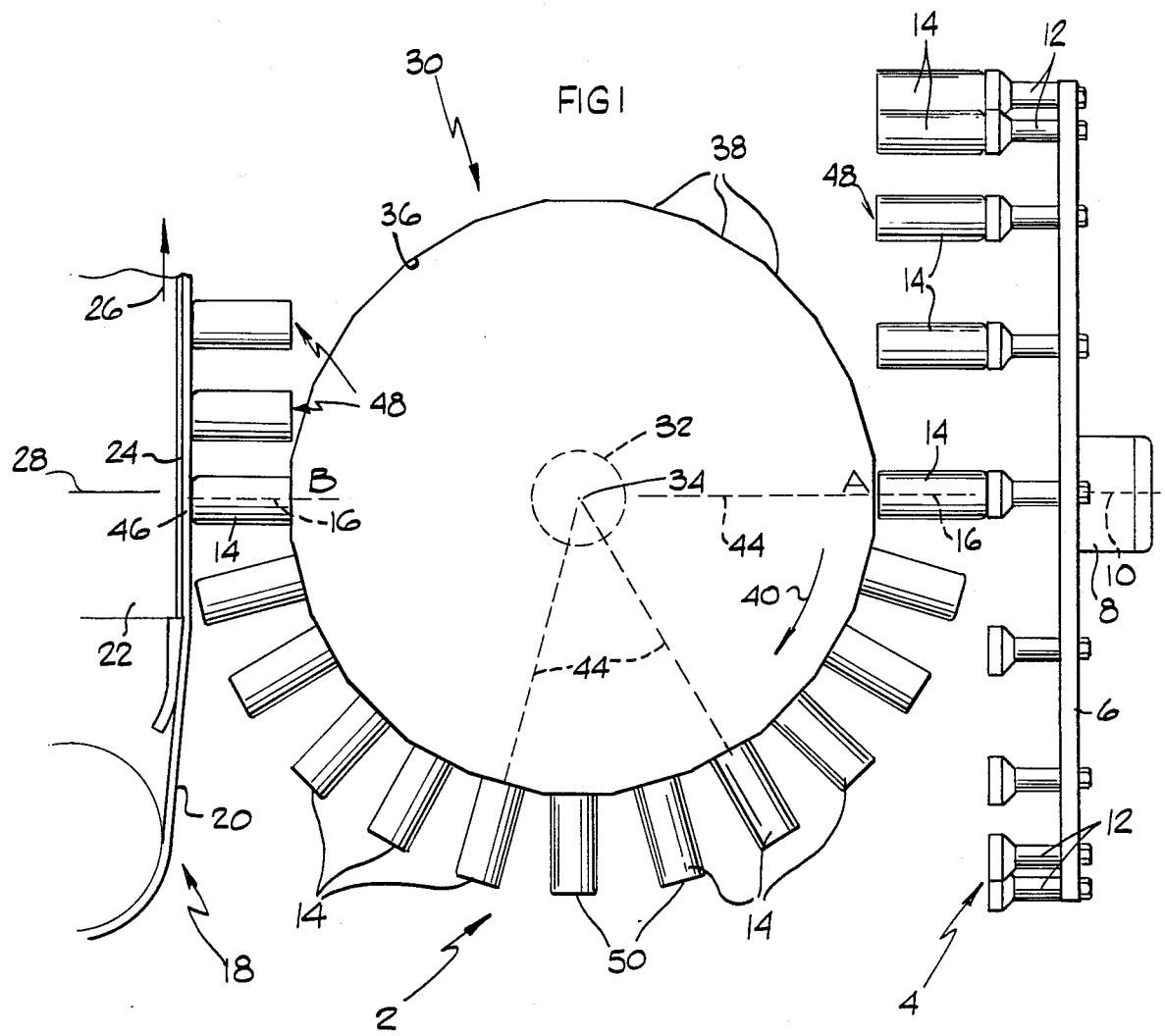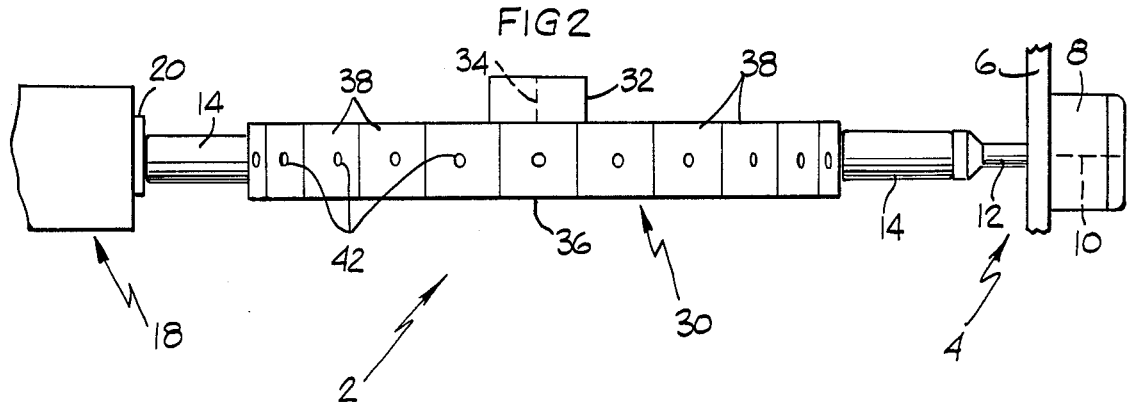

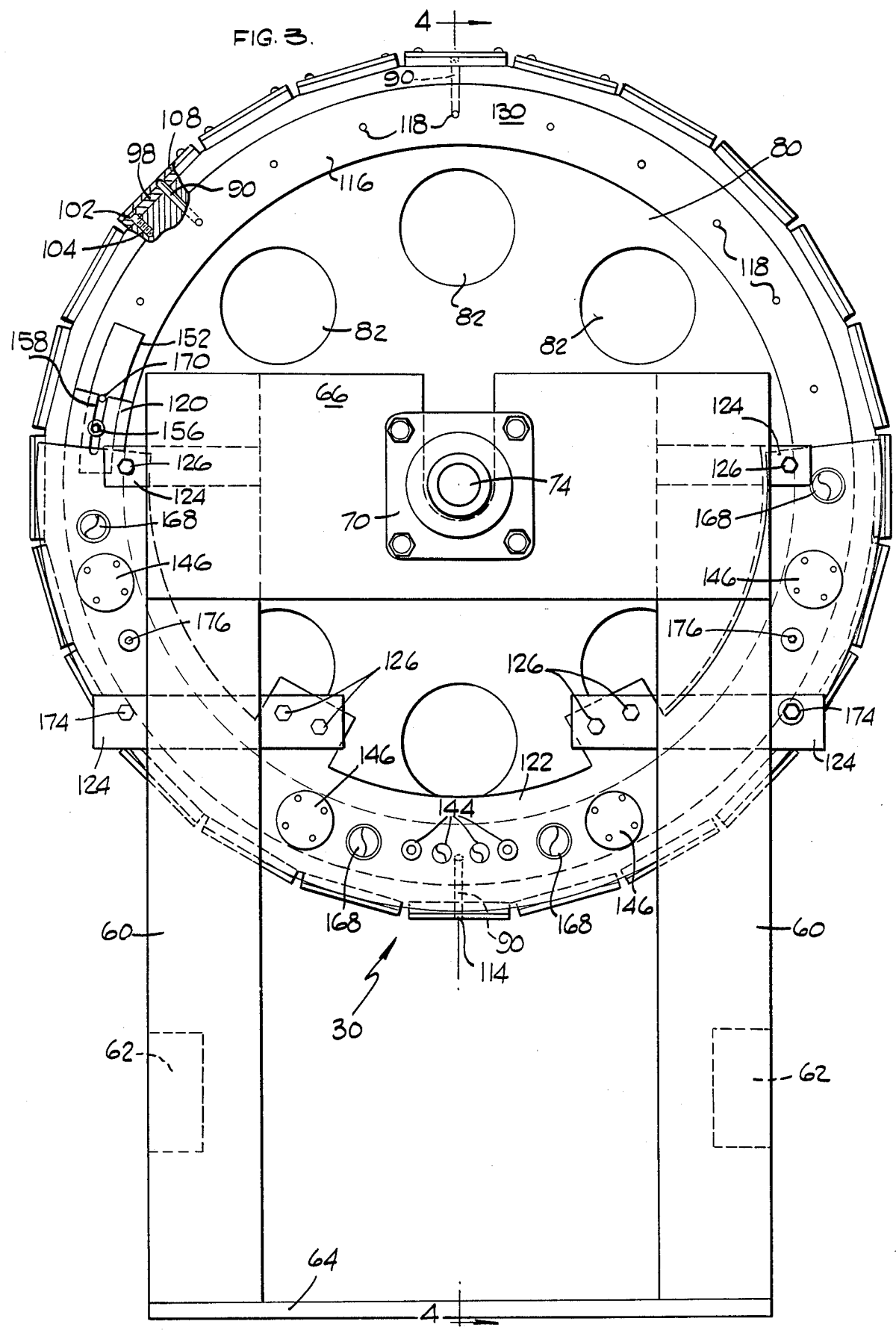

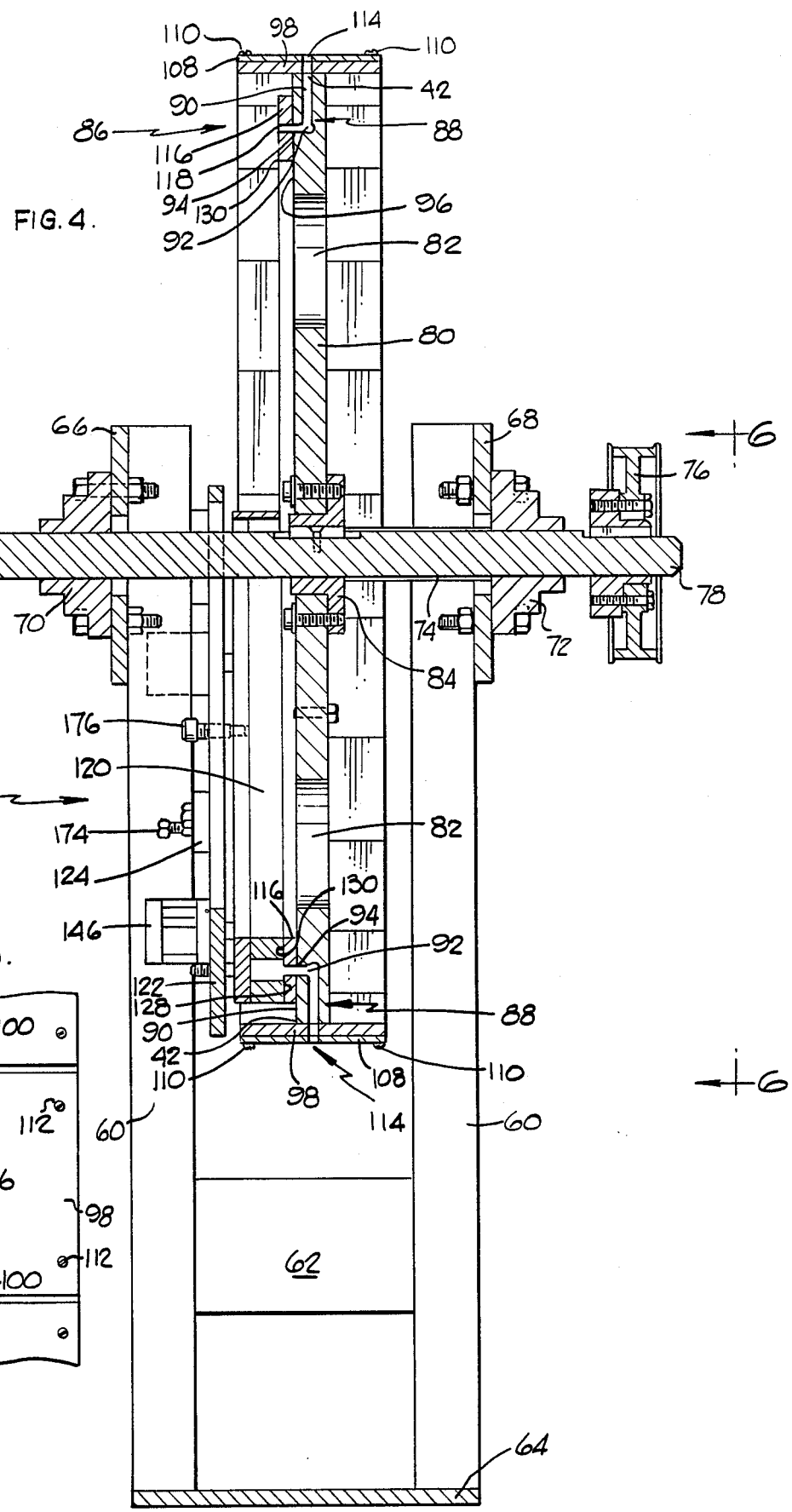

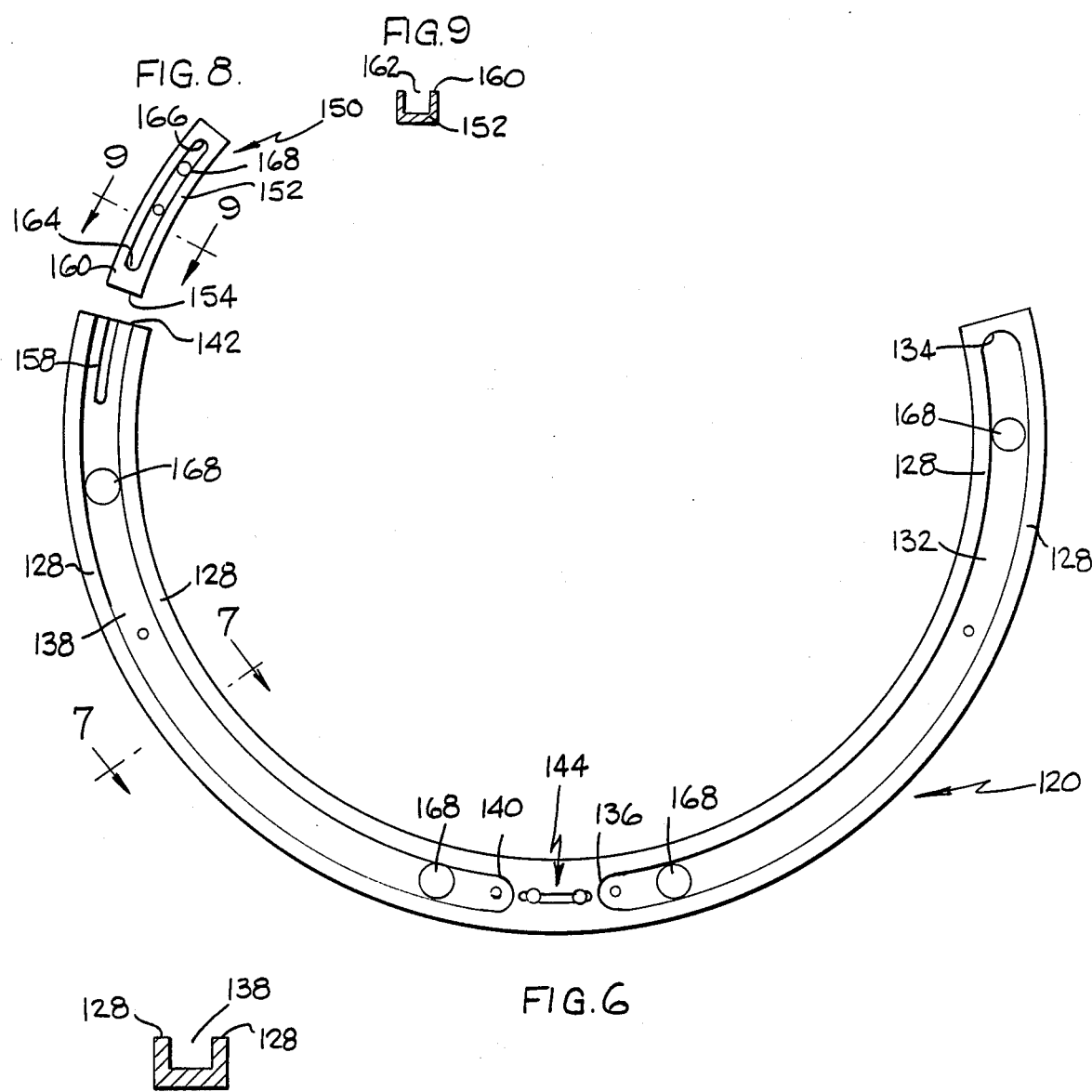

CONTAINER TRANSFER SYSTEM

FIELD OF THE INVENTION

The present invention generally relates to the container manufacturing art and, more particularly, container conveyor and transfer apparatus used in connection with the decoration or coating of containers such as can body members.

BACKGROUND OF THE INVENTION

At the present time, containers of the can body member type, sometimes also referred to as cans, are conventionally decorated or coated by continuously moving decorator apparatus, sometimes also referred to as printing or printer or coater apparatus, which has a continuously rotatable container carrying mandrel wheel with circumferentially spaced container carrying mandrel devices for carrying undecorated containers along a first arcuate path of movement from a loading station to a transfer station, with circumjacent ink applying devices being associated with the container along the path of movement thereof to apply ink images onto the outer peripheral container surfaces. Such can body members have a cylindrical side wall portion, a closed bottom and wall portion, and an open rim end portion. The decorated containers are conventionally transferred from the rotatable mandrel wheel to circumferentially spaced support devices on a continuously rotatable container transfer wheel which carries the decorated containers away from the rotatable mandrel wheel along a second arcuate path. The decorated containers are then conventionally directly transferred from the rotatable transfer wheel to longitudinally spaced support pins on a continuously moving container conveyor chain, sometimes referred to as a deco chain, by which the decorated containers are carried to and through an ink curing and drying oven. Because of the numerous parts of the deco chain, there is a tendency for them to wear out and break down when operated at high speeds of 1,200–1,400 containers per minute in a contaiunuous operation. In U.S. Pat. No. 4,445,431 to Stirbis, which is incorporated herein by reference thereto, there is disclosed a disk transfer system used as part of a can decorating or coating system. In U.S. Pat. No. 4,565,713 to Schultz, which is incorporated herein by reference thereto, there is disclosed a vacuum belt system for use in removing containers from the deco chain and carrying them through an ultraviolet radiation curing oven. The advantages resulting from the inventions in these patents were not completely realized for there still existed problems in transferring the containers from the vacuum disk transfer in the Stirbis patent to the vacuum belt in the Schultz patent.

BRIEF DESCRIPTION OF THE INVENTION

This invention provides a container transfer system that transfer containers between a first container carrying apparatus, such as the continuously moving rotatable wheel type apparatus illustrated in the Stirbis patent, and a second container carrying apparatus, such as the continuously moving vacuum belt conveyor and curing oven illustrated in the Schultz patent, using a continuously moving rotatable transfer wheel means.

In a preferred embodiment of the invention, a continuously rotating container transfer wheel means is mounted between a first container carrying means and a second container carrying means and functions to transfer decorated containers having images of wet ink on the other peripheries thereof from the first container carrying means to the second container carrying means for passage through an ultraviolet curing means. As illustrated in the Stirbis patent, the disk transfer means has a fixedly located axis of rotation and carries the containers so that the longitudinal axis of each container is parallel to the axis of rotation. The transfer wheel means has a fixedly located axis of rotation that is perpendicular to the axis of rotation of the first container carrying apparatus and has a periphery comprising a plurality of spaced apart container carrying means, such as a plurality of rectangular pads, wherein each of the pads has connecting means for connecting each pad to a vacuum source and which connecting means is located on a radius of the transfer wheel means. The transfer wheel means is located relative to the first container carrying apparatus so that each of the pads moves into and out of a juxtaposed relationship with one end of a container being carried by the first container carrying means and wherein the longitudinal axis of such container is in alignment with a radius of the transfer wheel means. A manifold means is mounted for operational relationship with the transfer wheel means and is connected to a suitable vacuum source. The beginning of the manifold means is located so as to apply the vacuum source to the connecting means of each pad when in the juxtaposed relationship to transfer the container from the first container carrying apparatus to the transfer wheel means. A continuously moving second container carrying apparatus comprises a vacuum belt means, as illustrated in the Schultz patent, having at least a portion thereof moving in a linear direction and which portion has a transverse axis which is perpendicular to the linear direction of movement. The transfer wheel means is located relative to the at least one portion of the second container carrying apparatus so that each of the pads moves into a juxtaposed relationship with at least a segment of the at least a portion wherein the longitudinal axis of the container being carried by the pad is in a parallel relationship with the transverse axis. The ending of the manifold means is located so that the application of the vacuum source to the pad is ended when the pad is in the juxtaposed relationship with the segment so that the container is transferred from the transfer wheel means to the second container carrying apparatus. In view of the relatively small number of moving parts, the container transfer system of this invention may be run continuously at high rates in excess of 1,400 containers per minute for substantially an unlimited amount of time.

BRIEF DESCRIPTION OF THE DRAWINGS

An illustrative and presently preferred embodiment of the invention is shown in the accompanying drawing in which:

FIG. 1 is a schematic illustration of the container transfer system of this invention;

FIG. 2 is a top plan view of FIG. 1;

FIG. 3 is a front elevational view of the transfer wheel means;

FIG. 4 is a cross-sectional view taken on the line 4—4 of FIG. 3;

FIG. 5 is a top plan view of portions of the mounting plates;

FIG. 6 is an elevational view of the manifold means and is a mirror image of the inner side of that portion of FIG. 3;

FIG. 7 is a cross-sectional view taken on the line 7—7 of FIG. 6;

FIG. 8 is an elevational view of the vacuum cut-off adjusting means and is a mirror image of the inner side of that portion of FIG. 3; and FIG. 9 is a cross-sectional view taken on the line 9—9 of FIG. 8.

DETAILED DESCRIPTION OF THE INVENTION

In FIGS. 1 and 2, there is illustrated a container transfer system 2 comprising a first container carrying apparatus 4, of the type illustrated in the Stirbis patent, comprising a continuously rotating mandrel wheel means 6 having mounting means 8 to provide a fixed axis of rotation 10 therefor. A plurality of spaced apart container carrying vacuum up devices on mandrels 12 project outwardly from the wheel means 6 and are connected to a vacuum source (not shown) so that during a portion of the rotation of the mandrel wheel means 6, each container carrying mandrel 12 carries a decorated container 14, having images of wet ink on the periphery thereof, so that the longitudinal axis 16 of each container 14 on each container carrying mandrel 12 is parallel to the axis of rotation 10. A second container carrying apparatus 18, of the type illustrated in the Schultz patent, comprises a continuously moving conveyor belt means 20 passing over a vacuum source 22 and wherein the conveyor belt means 20 is constructed so that when it passes over the vacuum source 22, it will hold any container 14 positioned thereon for movement therewith. At least a portion 24 of the conveyor belt means 20 moves in a linear direction, as indicated by the arrow 26, as it passes over the vacuum source 22 and has a transverse axis as indicated by the arrow 28. The longitudinal axis 16 of each container 14 carried on the conveyor belt means 20 is parallel to the transverse axis 28.

A transfer wheel means 30 is mounted by mounting means 32 for continuous rotation about a fixed axis of rotation 34 which is perpendicular to the fixed axis of rotation 10. The transfer wheel means 30 has a peripheral surface 36 having a plurality of spaced apart generally planar surfaces 38, described more fully below, and is rotated in the direction indicated by the arrow 40. A central opening 42 in each of the planar surfaces 38 is connected to a vacuum source, described below, so that as the transfer wheel means 30 rotates from a location A to a location B, a container 14 will be carried by pads, attached to each planar surface 38, as described below, from location A to location B. Each central opening 42 lies on a radius 44 of the transfer wheel means 30. In operation, as the transfer wheel means 30 rotates, one of the planar surfaces will move into a juxtaposed relationship with one of the containers 14 on the first container carrying apparatus 4 adjacent to location A wherein the longitudinal axis 16 of the container 14 is in alignment with a radius 44 of the transfer wheel means 30. At this time, the vacuum being applied to the associated container carrying mandrel 12 is discontinued and a vacuum is applied to the associated planar surface 38 so that the container 14 will be transferred from the first container carrying apparatus 4 to the transfer wheel means 30 for movement therewith. As the transfer wheel means 30 continues to rotate, a planar surface 38 carrying a container 14 will move into a juxtaposed relationship with a segment 46 of the at least a portion 24 of the conveyor belt 20 means adjacent to the location B wherein the longitudinal axis 16 of the container 14 is parallel to the transverse axis 28. At this time, the vacuum being applied to the associated planar surface 38 is discontinued and a vacuum is applied to the segment 46 so that the container 14 will be transferred from the transfer wheel means 30 to the conveyor belt means 20 for movement through a curing oven as described in the Schultz patent. As illustrated in FIG. 1, each container 14 carried by the first container carrying apparatus 4 has its open end 48 exposed; each container 14 carried by the transfer wheel means 30 has its closed end 50 exposed and each container 14 carried by the conveyor belt means 20 has its open end 48 exposed. Thus, the closed bottom end portions of the containers are supportively engaged by vacuum cup devices 12 and belt 20 while the open rim end portions are supported on planar surfaces 38 of transfer wheel means 30.

The transfer wheel means 30 is illustrated more specifically in FIGS. 3 and 4 and comprises a plurality of supporting members 60 joined together by a plurality of beams 62 and positioned on a fixed base 64. A first bearing support plate 66 is secured to two of the supporting members 60 adjacent to the top portions thereof and a second bearing support plate 68 is secured to an opposite two of the supporting members 60 adjacent to the top portions thereof. A first bearing block 70 is secured to the first bearing support plate 66 and a second bearing block 72 is secured to the second bearing support plate 68. A shaft means 74 is rotatably mounted in the bearing blocks 70 and 72. A drive mechanism 76 is secured to one end 78 of the shaft means 74 and is connected to a suitable drive means (not shown), such as a conventional drive chain, to rotate the drive mechanism 76 and therefore the shaft means 74.

A one piece annular disk member 80, which is preferably made of machined aluminum plate or cast material. The disk member 80 has a plurality of cut-out portions 82 to reduce the weight thereof. A hub 84 is secured to the disk member 80 and to the shaft means 74 so that the hub 84 and the disk member 80 rotate with the shaft means 74. The peripheral surface 36 of the disk member 80 comprises a plurality of the planar surfaces 38. Connecting means 86 are provided for connecting the central opening 42 in each planar surface 38 to a vacuum source and includes an L-shaped passageway 88 with the long leg 90 ending at the central opening 42. The short leg 92 has an opening 94 in the front surface 96 of the disk member 80. A rectangular plate 98 is secured to each planar surface by conventional means such as chamfered holes 100 and threaded bolts 102 secured to threaded openings 104. A central opening is formed in each rectangular plate 98 and is aligned with a central opening 42. A rectangular pad 108 is mounted on each rectangular plate 98 by threaded bolts having head 110 secured in threaded openings 112 in each rectangular plate 98. A central opening 114 is formed in each of the rectangular pads 108 and is aligned with the central openings 42 and 106. An annular manifold ring 116 is secured to the front surface 96 of the disk member 80 and has a plurality of openings 118, each of which is in aligment with the opening 94 in each short leg 92.

A manifold means 120 is secured to a manifold carrier 122 which is secured to frame members 124 by bolts 126. The manifold means 120 is arcuately shaped and extends through an arc of about 210 degrees. The manifold means 120, as illustrated in FIG. 6, has a smooth planar inner surface 128 which is mounted so as to be in surface-to-surface contact with a smooth planar surface 130 of the manifold ring 116, as described below. A first arcutate groove 132 is formed in the inner surface 128 and has a first closed end 134 which functions as the manifold beginning means and a second closed end 136. A second arcuate groove 138 is formed in the inner surface 128 and has a closed end 140 and an open end 142. A conventional defective can discharge means 144 is located between the second closed end 136 and the closed end 140. In such a system, if a defective can is identified, a jet of air is emitted at the area 144 to blow the defective can away. If no jet of air is emitted at the the vacuum in the slot of the defective can discharge means 144 causes the can to remain in position between the closed ends 136 and 140. The manifold means 120 is secured to the manifold carrier 122 by conventional spring urged mounting means 146 so that the inner surface 128 fo the manifold means 120 is resiliently urged against the smooth planar surface 130 of the manifold ring 116.

In FIGS. 8 and 9, there is illustrated adjustment means 150 for closing the open end 142 of the second arcuate groove 138 and which functions to provide the manifold ending means. The adjustment means 150 comprises a solid arcuately shaped member 150 comprises a solid arcuately shaped member 152 dimensioned so that it may have closely fitting sliding movement in the second arcuate groove 138. The arcuately shaped member 152 has a solid end portion 154 which functions as the manifold ending means. A thumb screw 156 extends outwardly from the arcuately shaped member 152 and passes through the arcuately shaped slot 158 of the manifold means 120 and locks the adjustable means 150 in any desired position by clamping the portions of the manifold means 150 adjacent to the arcuately shaped slot 158 between the head of the thumb screw 152 and the surface of the arcuately shaped member 152 so that the manifold ending means of the manifold means 120 may be adjusted. The inner surface 160 has an arcuately shaped groove 162 formed therein having closed ends 164 and 166. A threaded opening 168 extend through the arcuately shaped member 152 and opens into the arcuately shaped groove 162. A fitting 170 is connected to a suitable source of pressurized air (not shown) and functions to provide a puff of air through the L-shaped passageway 88 to ensure that the container is transferred from the transfer wheel means 30 to the second container carrying apparatus 18.

The radius of the centerlines of the arcuately shaped grooves 132, 138 and 162 is the same as the radius to the center of each opening 118. The transfer wheel means 30 and the manifold means 120 are mounted so that, as the annular disk member 80 rotates, each of the openings 118 passes over the arcuately shaped grooves 132 and 138 so as to have a suction applied thereto and over the arcuately shaped groove 162 to have a puff of air applied thereto. There are four vacuum ports 168 connected to a suitable vacuum source (not shown), but the number of vacuum ports can vary. Also, conventional jacking screws 174 bear against the manifold carrier 122 for adjusting the manifold means 120. Conventional shoulder screws 176 are mounted on the manifold means 120 and float in openings in the manifold carrier 122 to prevent rotation of the manifold means 120.

In operation, containers 14 are carried by the container carrying mandrels 12 so that the longitudinal axis of each container 14 is parallel to the axis of rotation 10 and the open ends 48 thereof are exposed. When a container 14 reaches location A with the longitudinal axis 16 of a container 14 aligned with a radius of the transfer wheel means 30, the suction being applied to the associated container carrying mandrel 12 is discontinued and suction is applied to a pad 108 which is in juxtaposed relationship to the open end 48 of the container 14 so that the container 14 is transferred from the first container carrying apparatus 4 to the transfer wheel means 30 with the closed end 50 of each container 14 exposed. The mandrel wheel means 6 and the transfer wheel means 30 are rotated so that the pad 108 and the open end 48 of the container 14 being transferred are moving at about the same speed when the container is transferred from the first container carrying apparatus 4 to the transfer wheel means 30. Each container 14 then moves with the pad 108 until it reaches location B with the longitudinal axis 16 thereof in parallel relationship with the transverse axis 28. The suction being applied to the pad 108 is discontinued and the suction being applied through the conveyor belt 20 causes the container 14 to be transferred from the transfer wheel means 30 to the second container carrying apparatus 18 with the open end 48 of each container exposed for the proper curing thereof. The speed of the second container carrying means 18 is slower than the speed of the transfer wheel means 30 at location B. In one embodiment of the invention, the speed of the second container carrying means 18 is two-thirds of the speed of the transfer wheel means 30 so that the containers 14 are located on the second container carrying means 18 with the centers thereof are spaced apart a distance of about 3.5 inches. The second container carrying apparatus 18 has its own driving means so it can move the containers thereon through the curing oven even if there is a break down in prior portions of the decorating system. This means that the ultra violet lights do not have to be adjusted. Also, the second container carrying apparatus 18 can be run at a slower speed for a more efficient operation. The arcuately shaped member 152 is originally positioned at a predetermined operational position. If the containers are not being transferred properly, the arcuately shaped member 152 can be adjusted while the transfer wheel means 30 is operating until proper operation is obtained.

In one use of the embodiment illustrated in FIGS. 2-9, the transfer wheel means 30 has a radius to the open end of the central opening 114 of about 15.125 inches. Twenty-four rectangular pads 108 are mounted on the annular disk member 80. The radius to the center of each opening 118 is about 13 inches which is the same as the radius to the centerline of the arcuate grooves 132, 138 and 162. The arcuate grooves 132 and 138 each have a radial extent of about 1.00 inch and have a depth of about 0.75 inch. The arcuate groove 162 has a radial extent of about 0.5 inch and a depth of about 0.5 inch. The transfer wheel means 30 is rotated at a speed of about 58.3 rpm so as to transfer about 1,400 containers per minute from the first container carrying apparatus to the second container apparatus. This rate of container transfer is illustrative only since containers may be transferred at rates in excess of 1,600 containers per minute.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. Apparatus for transferring decorated containers having wet images on the outer peripheries thereof between a first container carrying apparatus comprising a continuously rotating disk transfer means of a high speed container decorator or coater machine and a second container carrying apparatus comprising a continuously moving vacuum belt means for carrying decorated containers through a curing oven comprising:

a continuously rotating first container carrying apparatus having a fixedly located axis of rotation and a plurality of spaced apart means for carrying decorated containers, each decorated container having an open end and a closed end, so that the longitudinal axis of each decorated container is parallel to said axis of rotation;

a continuously rotating transfer wheel means having a fixedly located axis of rotation that is perpendicular to said axis of rotation of said first container carrying apparatus;

said transfer wheel means having a front surface, a back surface and a peripheral surface comprising a plurality of spaced apart container carrying means;

each of said container carrying means having a connecting means for connecting said container carrying means to a vacuum source, said connecting means having at least a portion thereof extending in a radial direction;

mounting means for locating said transfer wheel means relative to said first carrying apparatus so that each of said container carrying means moves into and out of a juxtaposed relationship with one end of one of the decorated containers being carried by said first container carrying apparatus wherein the longitudinal axis of the decorated container is in alignment with a radius of said transfer wheel means;

manifold means mounted for operational relationship with said transfer wheel means;

a vacuum source connected to said manifold means;

manifold beginning means for applying said vacuum source to said connecting means of each of said container carrying means when in said juxtaposed relationship to transfer a decorated container from said first container carrying apparatus to said transfer wheel means;

a continuously moving second container carrying apparatus comprising a vacuum belt means having at least a portion thereof moving in a linear direction and having a transverse axis which is perpendicular to said linear direction;

said mounting means locating said transfer wheel means so that each of said container carrying means moves into an out of a juxtaposed relationship with at least a segment of said at least a portion of said second container carrying apparatus wherein the longitudinal axis of the decorated container being carried by said container carrying means of said transfer wheel means is in a parallel relationship with said transverse axis; and manifold ending means for discontinuing the application of said vacuum source to said container carrying means when in said juxtaposed relationship with said segment so that the decorated container is transferred from said transfer wheel means to said second container carrying apparatus.

2. Apparatus as in claim 1 wherein:
the speed of said container carrying means when in said juxtaposed relationship is the same as the speed of said decorated container being transferred from said first container carrying apparatus.

3. Apparatus as in claim 2 and further comprising:
separate drive means for rotating said transfer wheel means and for moving said second container carrying apparatus.

4. Apparatus as in claim 3 and further comprising:
said transfer wheel means and said first container carrying apparatus are driven by the same drive means.

5. Apparatus as in claim 1 wherein said transfer wheel means comprises:
a disk having a peripheral surface comprising a plurality of similarly shaped segments;
a vacuum pad secured to each of said segments;
a plurality of L-shaped passageways in said disk, each having at least one leg thereof extending in a radial direction and having an open end in each of said segments; and
each of said vacuum pads having a hole extending therethrough and aligned with said open end in each of said segments.

6. Apparatus as in claim 5 and further comprising:
a ring shaped member secured to said front surface of said disk;
the other leg of each of said L-shaped passageways having an open end in said front surface of said transfer wheel means;
said ring shaped member having a plurality of holes extending therethrough;
said ring shaped member being secured to said front surface so that each of said holes therein is aligned with an open end of said other leg of each of said L-shaped passageways; and
said ring shaped member having an annular exposed surface that is relatively smooth and planar.

7. Apparatus as in claim 6 and further comprising:
a manifold means fixedly mounted in juxtaposition to said ring shaped member and having a surface slidably engaged said exposed surface of said ring shaped member to enable rotation of said ring shaped member relative to said manifold means;
arcuate groove means in said manifold means located to be in alignment with said holes in said ring shaped member during a portion of the rotational movement of said ring shaped member to enable vacuum to be applied to said holes;
at least one vacuum supply port connected to said arcuate groove means; and
mounting means for holding said manifold means in circumferentially fixed relationship to said ring shaped member.

8. Apparatus as in claim 7 wherein:
one end of said arcuate groove means is mounted at a location to provide said manifold beginning means; and
the other end of said arcuate groove means is mounted at a location to provide said manifold ending means.

9. Apparatus as in claim 1 and further comprising:
said first container carrying apparatus carrying each of said decorated containers to that its open end is exposed;

said transfer wheel means carrying each of said decorated containers so that its closed end is exposed; and said second container carrying apparatus carrying each of said decorated containers so that its open end is exposed.

10. Apparatus as in claim 1 and further comprising:
force applying means located adjacent to said manifold ending means to apply a force to each of said decorated containers so as to ensure that each of said decorated containers is transferred from said vacuum pad to said second container carrying apparatus.

11. Apparatus as in claim 10 and further comprising:
adjusting means for varying the location of said force applying means and the location of said manifold ending means.

12. Apparatus as in claim 11 wherein said transfer wheel means comprises:
a disk having a peripheral surface comprising a plurality of similarly shaped segments;
a vacuum pad secured to each of said segments;
a plurality of L-shaped passageways in said disk, each having at least one leg thereof extending in a radial direction and having an open end in each of said segments;
each of said vacuum pads having a hole extending therethrough and aligned with said open end in each of said segments;
a ring shaped member secured to said front surface of said disk;
the other leg of each of said L-shaped passageways having an open end in said front surface of said transfer wheel means;
said ring shaped member having a plurality of holes extending therethrough;
said ring shaped member being secured to said front surface so that each of said holes therein is aligned with an open end of said other leg of each of said L-shaped passageways;
said ring shaped member having an annular exposed surface that is relatively smooth and planar;
a manifold means fixedly mounted in juxtaposition to said ring shaped member and having a surface slidably engaging said exposed surface of said ring shaped member to enable rotation of said ring shaped member relative to said manifold means;
arcuate groove means in said manifold means located to be in alignment with said holes in said ring shaped member during a portion of the rotational movement of said ring shaped member to enable vacuum to be applied to said holes;
at least one vacuum supply port connected to said arcuate groove means; and
mounting means for holding said manifold means in circumferentially fixed relationship to said ring shaped member.

13. Apparatus as in claim 12 wherein said adjusting means comprises:
an arcuately shaped block member mounted for sliding movement in said arcuate groove means at said manifold ending means:
said block member having a closed end for defining the end of said arcaute groove means;
an arcuately shaped slot in said block member opening in the same direction as said arcuate groove means;

said arcuately shaped slot being aligned with said holes in said ring shaped member during a portion of the rotational movement of said ring shaped member; and pressurized air supplying means for supplying air under pressure into said arcuately shaped slot so that pressurized air will flow through each of said holes to apply a jet of pressurized air to each of said decorated containers to ensure the transfer thereof.

14. Apparatus as in claim 13 and further comprising:
retaining means for retaining said adjusting means in a desired location.

15. Apparatus as in claim 10 wherein:
each of said vacuum pads has a generally planar outer surface on which said decorated container is supported.

16. A method for transferring decorated containers, each having an open end and a closed end and having wet images on the outer periphery thereof, between a first container carrying apparatus comprising a continuously moving rotatable mandrel wheel type apparatus of a high speed container decorator or coater machine and a second container carrying apparatus comprising a continuously moving vacuum belt having at least one portion moving in a linear direction for carrying the decorated containers through a curing oven comprising:
mounting a first container carrying apparatus comprising a continuously moving rotatable mandrel wheel type apparatus so that said first container carrying apparatus rotates about a fixed axis of rotation;
holding a plurality of decorated containers, each having an open end and a closed end and having wet images on the outer periphery thereof on said first carrying apparatus so that the longitudinal axis of each decorated container is parallel to said axis of rotation of said first carrying apparatus;
mounting a continuously moving rotatable transfer wheel means so that said transfer wheel means rotates about a fixed axis of rotation that is pependicular to said fixed axis of rotation of said first container carrying apparatus;
forming a plurality of spaced apart container carrying means on the periphery of said transfer wheel means to hold one of said decorated containers thereon;
connecting said container carrying means to a vacuum source during a portion of each rotation of said transfer wheel means to hold said decorated containers thereon in a spaced apart relationship;
transferring a decorated container from said first container carrying apparatus to said transfer wheel means when the longitudinal axis of said decorated container on said first container carrying apparatus moves into alignment with a radius of said transfer wheel means;
mounting a second container carrying apparatus comprising a continuously moving vacuum belt having at least a portion thereof moving in a linear direction so that the transverse axis thereof is perpendicular to said axis of rotation of said transfer wheel means; and
holding said decorated containers on said second container carrying apparatus so that the longitudinal axis thereof is parallel to said transverse axis; and transferring a decorated container from said transfer wheel means to said second container carrying apparatus when the longitudinal axis of said decorated container on said periphery of said transfer wheel means moves into a parallel relationship with said transverse axis.

17. A method as in claim 16 and further comprising:
holding each of said decorated containers on said first container carrying apparatus wherein the closed end of each decorated container is held against said first container carrying apparatus;
holding each of said decorated containers on said transfer wheel means wherein the open end of each container is held against said periphery of said transfer wheel means; and
holding each container on said second container carrying apparatus wherein the closed end of each container is held against said second container carrying apparatus.

18. Apparatus for transferring cylindrical can members or the like having a cylindrical can body portion and an open rim end portion and a closed bottom end portion between a first work station such as a can decorator or the like to a second work station such as an oven or the like comprising:
first continuously rotatable can transfer wheel means having a plurality of can supporting devices mounted in circumferentially spaced relationship on a side surface thereof for receiving can members from the first work station and engaging the closed bottom end portion thereof and carrying the can members in a first circular path of movement in a first generally vertical plane about a central generally horizontal axis of rotation;
second continuously rotatable can transfer wheel means having a plurality of can supporting devices mounted in circumferentially spaced relationship on circumferential peripheral surface means provided thereon for receiving can members from said first can transfer wheel means and engaging the open rim end portions thereof and carrying the can members in a second circular path of movement in a second generally vertical plane, which is transverse to said first generally vertical plane, about a second central generally horizontal axis of rotation which is transverse to said first axis of rotation and which includes a path portion adjacent said first can transfer wheel means whereat the can members are transferred to said second can transfer wheel means from said first can transfer wheel means by linear movement parallel to said first axis of rotation; and
a third continuously movable can transfer belt means having can supporting means thereon for receiving can members from said second can transfer wheel means and engaging the closed bottom end portion thereon and carrying the can members to the second work station along a path of movement including a linear path portion adjacent said circumferential peripheral surface means on said second can transfer wheel means whereat the can members are transferred from said second can transfer wheel means to said can transfer belt means by linear movement transverse to said second axis of rotation.

19. The invention as defined in claim 18 and wherein said plurality of can supporting devices on said second transfer wheel means comprising:
a plurality of equally circumferentially spaced flat chordal peripheral surface segments of larger area than the cross-sectional area of the can members so as to enable each of said chordal surface segments to abuttingly engage the open rim end portion of one of the can members; and
vacuum supply means centrally located in each of said chordal peripheral surface segments for supplying vacuum thereto to hold a can member thereon during transfer from said first can transfer wheel means to said third can transfer means.

20. The invention as defined in claim 19 and wherein said plurality of can supporting devices on said first can transfer wheel means comprising:
a plurality of equally circumferentially spaced vacuum cup devices for abuttingly engaging the closed bottom end portion of one of the can members and for supplying vacuum thereto during transfer from the decorator machine to said second can transfer wheel means.

21. The invention as defined in claim 20 and wherein said third can transfer means comprising:
a belt means having can support surface means for abutting engagement with the closed bottom end portions of the can members; and
vacuum applying means associated with said belt means for applying vacuum to the closed bottom end portions of the can members during transfer from said moving belt means to the second work station.

22. The invention as defined in claims 19, 20 or 21 and wherein each of said plurality of can supporting devices on said second transfer wheel means further comprising:
separate plate means mounted on the periphery of said second transfer wheel means and having a central vacuum passage means extending therethrough for supporting the closed bottom end portions of the can members on said plate means in coaxial alignment with said central vacuum passage means solely by vacuum applied thereto through said central vacuum passage means.

* * * * *